United States Patent [19]

Rosenwinkel et al.

[11] Patent Number: 4,773,889
[45] Date of Patent: Sep. 27, 1988

[54] WHEEL FOR A TOY VEHICLE

[75] Inventors: Donald A. Rosenwinkel, Oak Park; Wayne A. Kuna, River Forest, both of Ill.

[73] Assignee: Marvin Glass & Associates, Chicago, Ill.

[21] Appl. No.: 797,602

[22] Filed: Nov. 13, 1985

[51] Int. Cl.[4] ............................................. A63H 17/26
[52] U.S. Cl. ..................................... 446/448; 446/462; 446/465; 152/454; 301/41 R
[58] Field of Search ............... 446/465, 437, 289, 290, 446/448, 462, 457; 152/454, 152; 301/41 R, 45, 46, 38 R, 39 R; 180/906, 20; 280/DIG. 7

[56] References Cited

U.S. PATENT DOCUMENTS

| | | | |
|---|---|---|---|
| 1,997,115 | 4/1935 | Merz, Jr. et al. | 446/465 |
| 3,517,721 | 6/1970 | Woodhall | 152/454 |
| 3,646,706 | 3/1972 | Adickes | 446/465 |
| 4,266,832 | 5/1981 | Delaunay et al. | 301/48 |
| 4,547,173 | 10/1985 | Jaworski et al. | 446/465 X |
| 4,601,519 | 7/1986 | D'Andrade | 446/465 X |

FOREIGN PATENT DOCUMENTS 1290857 9/1972 United Kingdom ................ 152/454

Primary Examiner—Mickey Yu
Attorney, Agent, or Firm—John S. Pacocha

[57] ABSTRACT

A toy vehicle wheel that changes from a generally cylindrical periphery with an initial diameter and axial width to a greater diameter periphery. The wheel has a hollow shell of rubber or some other flexible material and opposed sidewalls of the wheel are moveable relative to each other to compress the axial width and increase the diameter. Across a substantial portion of the initial axial width a number of slits extend so that the periphery is serrated when it is enlarged. In one form, an axial screw engages a sidewall to rotate the wheel in its initial quiescent condition along a relatively unobstructed surface, but, upon encountering an obstruction, will draw the one sidewall toward the other. Variations provide for containing the axial screw within the compressed wheel or permitting it to extend out of a sidewall. Other forms provide for movement of the sidewalls relative to each other with bayonet locking in a desired condition and for spring bias in one direction.

28 Claims, 1 Drawing Sheet

U.S. Patent  Sep. 27, 1988  4,773,889
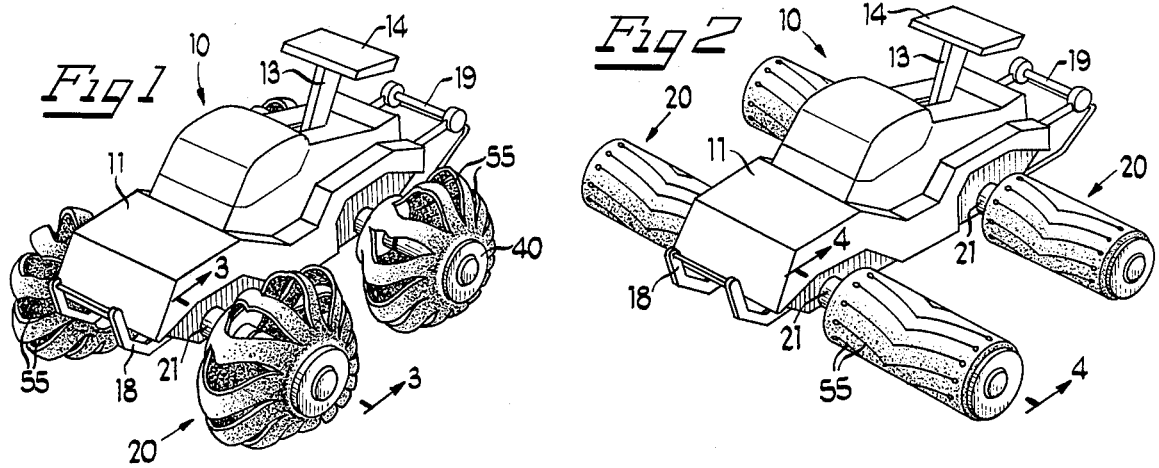
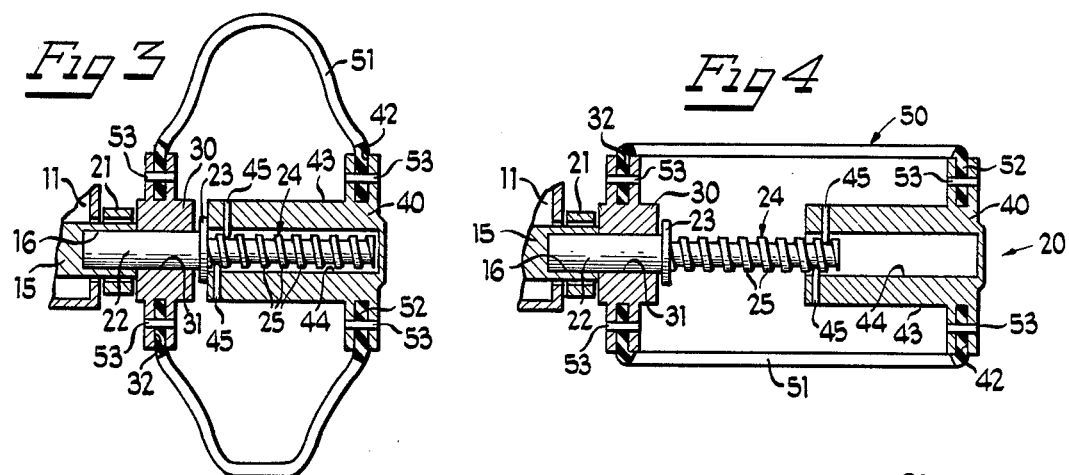
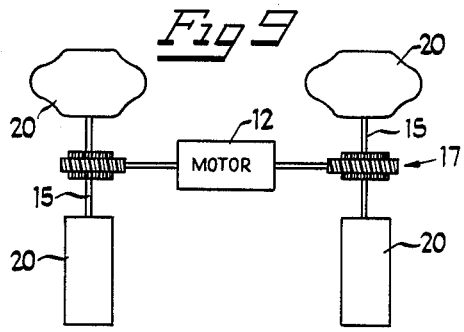
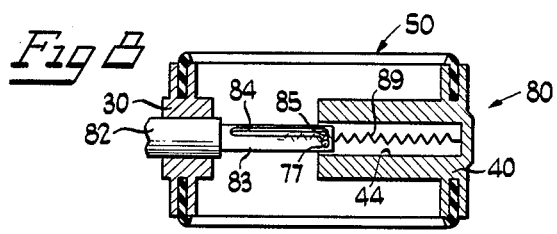
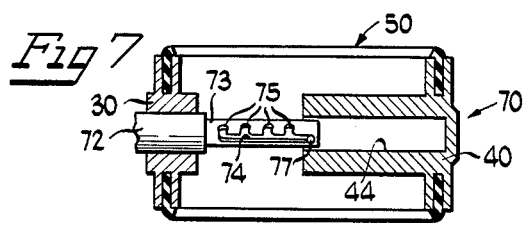
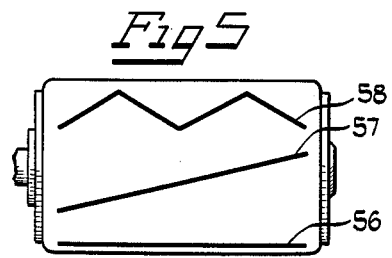
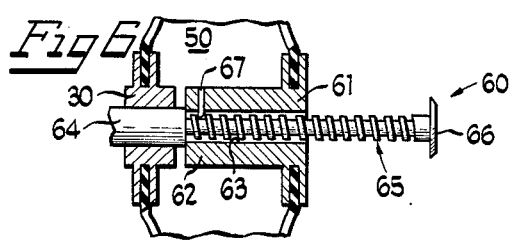

WHEEL FOR A TOY VEHICLE

BACKGROUND OF THE INVENTION

1. Field of the Invention

This invention relates generally to toy vehicles and more particularly to a wheel assembly for toy vehicles.

2. Background Art

Toy vehicles, in particular, toy vehicles having a feature that facilitates the ability of the vehicle to clamber over various surfaces and obstacles are popular playthings. U.S. Pat. No. 4,547,173 discloses a toy vehicle having wheels out of which claws automatically extend when the wheel slips upon encountering a rough surface or obstruction. There remains, however, a need for other types of toy vehicle wheel assemblies that change both their appearance and ability to assist the toy vehicle in overcoming obstructions.

SUMMARY OF THE INVENTION

The present invention is concerned with providing a wheel assembly for a toy vehicle in which a wheel having an initial diameter and axial width with a periphery in contact with a playing surface changes to one of a larger diameter, narrower axial width with an enlarged periphery. This and other objects and advantages of the invention are achieved by a wheel assembly having a generally cylindrical hollow shell of an initial axial width and central diameter. One sidewall of the wheel is movable relative to the other to compress the axial width, increase the diameter, and enlarge the periphery. Extending across a substantial portion of the initial axial width of the generally cylindrical peripheral wall are a number of slits in the peripheral surface. When the sidewalls are moved together, the slits serrate the peripheral surface. In one form, the sidewalls are driven together along an axial screw with a hub of one of the sidewalls including an inwardly extending socket to receive the screw. As an alternative, the screw may be permitted to extend out one of the sidewalls of the compressed wheel. Yet another form provides for manual movement of the sidewall with bayonet locking at various increments of axial width. Still a further version includes a biasing spring urging the sidewalls relative to each other.

BRIEF DESCRIPTION OF THE DRAWINGS

For a better understanding of the present invention reference may be had to the accompanying drawing in which:

FIG. 1 is a perspective view of a toy vehicle embodying the present invention with the wheels in their enlarged diameter, serrated periphery condition;

FIG. 2 is a perspective view of the vehicle shown in FIG. 1 with the wheels in their quiescent, axially extended condition;

FIG. 3 is an enlarged scale sectional view taken generally along line 3—3 of FIG. 1;

FIG. 4 is an enlarged scale sectional view taken generally along line 4—4 of FIG. 2;

FIG. 5 is a reduced scale elevational view of a modified wheel assembly;

FIG. 6 is a reduced scale sectional view of an alternative embodiment of a wheel assembly taken generally along a line like 3—3 of FIG. 1;

FIG. 7 is a reduced scale sectional view of yet another alternative embodiment taken generally along a line like 4—4 of FIG. 2;

FIG. 8 is a reduced scale sectional view taken along a line like 4—4 of FIG. 2; and FIG. 9 is a reduced scale schematic view of a toy vehicle with some of the wheel assemblies of the present invention in both conditions.

DETAILED DESCRIPTION OF THE PREFERRED EMBODIMENT

Referring now to the drawings in which like parts are designated by like reference numerals throughout the several views, there is shown in FIG. 1 a vehicle 10 with a chassis 11. Inside chassis 11 is a motor 12, which may be any conventional battery motor, spring motor or inertia motor presently used in toy vehicles, the output of which is reversible, either directly or through gearing. Extending upwardly and outwardly from the rearward half of the chassis is a switch lever 13 which may conveniently include a spoiler 14 providing a relatively large, easily accommodated, handle. Lever 13 is connected through conventional switching mechanisms (not shown) of a type compatible with the selected motor to one of three, forward-on, neutral-off, or reverse-on positions.

Spaced apart axles 15 are provided with an axial bore 16 in each end. The axles are carried by the chassis for rotation relative to the chassis and are driven by motor 12 through conventional gearing such as the illustrated worm and worm gear combinations 17 of FIG. 9 or such as are disclosed, for example, in U.S. Pat. Nos. 4,459,776 and 4,467,557. Chassis 11 may also carry, or be integrally formed with, a forward set of bumper-runners 18 facilitating sliding of the underside of chassis 11 up and over an obstruction as well as a wheelie-bar 19 extending from the rear.

Each end of each axle 15 carries a generally cylindrical, hollow wheel 20. Between the chassis and the wheel, a spacer 21 may be provided. Part of the wheel includes a stubshaft 22 with an inside end that fits, and is secured, in a bore 16 of the axle to rotate with the axle. Shaft 22 may be secured in the bore by friction fit, adhesive, ultrasonic welding, heat staking, a transverse pin or the like. In the automatic embodiment shown in FIGS. 3 and 4, the free end of shaft 22 includes flange 23 and an integral, coaxially extending, screw shaft 24 with threads 25.

The wheel of each of the embodiments has an internal sidewall hub 30 made of a relatively rigid plastic with a generally centrally disposed opening 31 which receives, and permits rotation of, stubshaft 22. Hub 30 is kept from moving along the axle by spacer 21 and flange 23. A relatively deep annular groove 32 extends in from the edge of the hub. As shown in FIGS. 3 and 4, an outer sidewall hub piece 40, also made of relatively rigid plastic, is formed with a relatively deep annular peripheral groove 42. Extending inwardly is a sleeve 43 having a generally axial socket 44 of a size to receive the screw shaft 24. Adjacent the open, inwardly directed, end of the socket are a pair of offset pins 45 projecting in to engage threads 25 of the shaft 24.

Between the sidewall hub pieces 30 and 40, there is a generally cylindrical hollow shell or tire 50 of rubber or some similar, relatively flexible material. The tire has an initially generally cylindrical peripheral wall 51 of a generally constant initial diameter and an initial predetermined axial length or width approximately twice the initial diameter. At each end of peripheral wall 51, tire 50 has sidewall rim portions 52 projecting in toward the axis that are received, and retained, in the respective grooves 32 and 42 of the inner and outer sidewall hubs. Retention of rim portions 52 in the grooves may be accomplished by suitable adhesives or a series of circumferentially spaced pins 53 extending through the respective rigid hub pieces and flexible sidewall rim as illustrated in FIG. 3.

Spaced circumferentially around the peripheral wall and extending along a substantial portion, approximately seventy-five to eighty percent, of the width are a plurality of slits 55 which in the embodiment shown in FIGS. 1 and 2 are of a shallow "V" shape. The length of the slits should be at least four times the thickness of the peripheral wall. As is illustrated in FIG. 5, the slits may be a straight line 56 parallel to the axis, a diagonal line 57, or a "M" or "W" shape 58. Other variations, including curved openings, may also be used.

During operation along a relatively flat playing surface, with the vehicle in forward drive, wheels 20 maintain their quiescent, generally elongated cylindrical shape as illustrated in FIG. 2 with the drive of motor 12 transmitted such as through gearing 17 to the axles 15. Stubshaft 22 and integral screw shaft 24 are in driving relationship with axle 15. Pins 45 engage threads 25 and serve as a slip clutch to transmit rotation of the axle to outer hub 40 and hence tire 50. However, when vehicle 10 encounters an obstruction which the quiescent wheels cannot easily overcome, the frictional engagement between pins 45 and threads 25 is overridden, forward rotation of tire 50 stops, and screw shaft 24 advances or moves into socket 44.

As shaft 24 enters socket 44 shortening the axial width of wheel 20, the diameter, particularly the diameter about the center of the axial width, increases to about twice the initial diameter and slits 55 open to form the enlarged diameter, serrated periphery, gripping wheel shown in FIG. 1. Various forms of slits such as 56, 57 and 58 create different resulting appearances when the wheel is compressed. To further enhance the drama of the enlarging and opening wheel, the inside surface of peripheral wall 51, or alternatively sleeve 43, may be made of a noticeably different color than the outside surface of tire 50.

To return the compressed enlarged diameter wheel to its elongated quiescent condition, the drive from motor 12 is reversed, which reverses the travel of pins 45 along threads 25 on screw shaft 24 and retracts the screw shaft from out of socket 44. The axial width or length of tire 50 upon reaching its initial normal width restrains further separating movement of the sidewalls.

In another embodiment, as illustrated in FIG. 6, a wheel 60 has an outer hub 61 formed with an integral sleeve 62 having an open bore 63 extending throughout its length. In such an alternative, a stubshaft 64 that would be received in the axial bore 16 of axle 15 would have a more elongated screw shaft 65 with a hub cap 66 on its outer free end. When wheel 60 is driven to its quiescent condition, hub cap 66, in addition to the axial width or length of tire 50, prevents outer sidewall hub 61 from being driven off of screwshaft 65.

Another modification in the embodiment shown in FIG. 6 is that only a single pin 67 is used. Extended shaft 65 provides a single, and hence stronger for its size, axial support of the entire wheel in its elongated, quiescent state. However, it results in part of the shaft protruding out of the wheel when the wheel is compressed. Such a showing of part of the operative mechanism, may reduce some of the mystery and drama of the change.

It will be appreciated by those skilled in the art, that the threaded shaft, either 24 as shown in FIGS. 3 and 4 or 65 as shown in FIG. 6, may be secured to the outer sidewall hub piece. In such a modification, the inner hub would move along the threaded shaft to effect the relative movement between the two opposed sidewalls.

FIG. 7 illustrates a wheel 70 embodying a manual version of the present invention. Stubshaft 72, rather than having a threaded shaft, has an extending tubular shaft 73 with an elongated slot 74 extending generally parallel to the axis of the shaft. A number of relatively short transverse notches 75 communicate with slot 74. Projecting into socket 44 is a pin 77 that rides in the slot 74 and which may be latched, by a slight twisting of the outer sidewall hub 40 into one of the notches 75 to effect a bayonet-type lock. Thus, outer sidewall hub piece 40 may be pushed axially in toward inner sidewall hub piece 30 and then selectively locked into one of the four shortened positions. This permits incremental increases of the central diameter and opening of the slits in selected incremental amounts.

Still another alternative wheel 80 is illustrated in FIG. 8 where shaft 82 has a tubular extension 83 with a slot 84 that only includes a single transverse notch 85. As in the embodiment shown in FIG. 7, a pin 77 rides in the elongated slot for bayonet locking the wheel in the elongated quiescent condition. A spring 89, or more particularly as illustrated in FIG. 8, a tension spring anchored at one end to the outer sidewall hub 40 and at its other end to shaft 82 biases the sidewalls toward each other. Thus, upon slightly twisting the outer sidewall to release the bayonet lock, the sidewalls will be pulled together shortening the width, increasing the diameter, and opening the slits. The spring would also keep the pin and notch in engagement to transmit rotation of the axle, shaft 82 and tubular extension 83 to the wheel as the vehicle moves along a flat playing surface. However, upon wheel 80 encountering an obstacle, the wheel, or more particularly outer hub 40, would twist to release the bayonet lock. Alternatively, the twisting could be done manually. Return of the wheel to the initial state would be manually effected.

Of course, notch 85 could be positioned at the other, internal, end of the elongated slot 84 with a compression spring in the socket. This arrangement would effect spring return of the wheel to the quiescent state from the enlarged diameter serrated surface obstacle overcoming condition illustrated in FIG. 1 upon release of the bayonet-type lock.

Using any of the embodiments shown and described, the condition of individual wheels of a four wheel drive vehicle may be selectively changed. Thus, as schematically illustrated in FIG. 9, both the front and rear wheels on one side could be left in the elongated, smaller diameter quiescent condition while the front and rear wheels on the other side are changed to the enlarged diameter serrated surface condition. As a result of such a configuration, the vehicle will tend to turn about a point on the side having the wheels in the quiescent condition. By enlarging the diameter of both front wheels, or alternatively both back wheels, the front or back, respectively, of the vehicle may be raised relative to a horizontal plane.

While a number of alternative embodiments of the present invention have been illustrated and described, it will be apparent that further variations, changes and modifications will occur to those skilled in the art. It is intended in the appended claims to cover all such variations, changes and modifications as fall within the true spirit and scope of the present invention.

What is claimed as new and desired to be secured by Letter Patent is:

1. A wheel for a toy vehicle comprising:
   a hollow wheel having spaced apart, rigid sidewalls and a flexible shell between the sidewalls forming an initial, generally cylindrical, peripheral wall of a predetermined thickness, an initial axial width and an initial central diameter;
   the wheel being mountable on an axle for rotation about an axis;
   means permitting movement of the sidewalls with respect to each other along the axis of rotation so that movement of the sidewalls toward each other along the axis of rotation decreases the initial width and increases the initial central diameter of the flexible shell forming an enlarged periphery capable of supporting the toy vehicle spaced from a playing surface; and
   means for automatically moving one of the sidewalls toward the other upon the wheel encountering an obstacle on the playing surface.

2. The wheel of claim 1 in which the initial width is approximately twice the initial central diameter.

3. The wheel of claim 1 in which the means permitting movement of the sidewalls with respect to each other and the means for automatically moving one of the sidewalls comprise:
   a screw coaxial with the axle; and
   means on one of the sidewalls engaging the screw to move the one sidewall relative to the other sidewall upon rotation of the screw overcoming the friction between the means and the screw.

4. A wheel for a toy vehicle comprising:
   a hollow wheel having spaced apart sidewalls and a flexible shell between the sidewalls forming an initial, generally cylindrical, peripheral wall of a predetermined thickness, an initial axial width and an initial central diameter;
   the wheel being mountable on an axle for rotation about an axis;
   means permitting movement of the sidewalls with respect to each other along the axis of rotation so that movement of the sidewalls toward each other along the axis of rotation decreases the initial width and increases the initial central diameter of the flexible shell forming an enlarged periphery capable of supporting the toy vehicle spaced from a playing surface; and
   a plurality of openings extending through the shell and across a portion of the initial width of the peripheral wall to serrate the periphery when it is enlarged.

5. The wheel of claim 2 in which the sidewalls each include a hub piece of relatively rigid material.

6. The wheel of claim 2 including means for automatically moving one of the sidewalls relative to the other upon the wheel encountering an obstacle on the playing surface.

7. The wheel of claim 4 in which each of the openings extend across a portion of the peripheral wall that is at least four times the thickness of the shell.

8. The wheel of claim 2 including means for biasing the sidewalls relative to each other.

9. The wheel of claim 2 in which the initial width is approximately twice the initial central diameter.

10. The wheel of claim 4 in which the means permitting movement of the sidewalls with respect to each other comprises:
    a screw coaxial with the axle; and
    mean on one of the sidewalls engaging the screw to move the one sidewall relative to the other sidewall upon rotation of the screw overcoming the friction between the means and the screw.

11. A toy vehicle comprising:
    a chassis;
    an axle carried by the chassis for rotation relative to the chassis;
    a hollow wheel having spaced apart sidewalls and a flexible shell of a predetermined thickness, an initial central diameter and an initial axial width between the sidewalls forming an initial, generally cylindrical, peripheral surface engagable with, and supporting the toy vehicle upon, a playing surface;
    the wheel mounted adjacent an end of the axle for rotation about an axis with the axle;
    means permitting movement of the sidewalls with respect to each other along the axis of rotation so that movement of the sidewalls of the wheel toward each other decreases the initial width and increases the initial central diameter of the flexible shell forming an enlarged periphery that engages, and supports the toy vehicle upon, the playing surface; and
    a plurality of openings extending through the shell and across a portion of the initial width of the peripheral surface of the shell so that the periphery becomes serrated when it is enlarged.

12. The toy vehicle of claim 11 including means for automatically moving one of the sidewalls relative to the other upon the wheel encountering an obstacle on the playing surface.

13. The toy vehicle of claim 11 in which the sidewalls each include a hub of relatively rigid material.

14. The toy vehicle of claim 11 including means for biasing the sidewalls relative to each other.

15. The toy vehicle of claim 11 in which the means permitting movement of the sidewalls with respect to each other comprises:
    a screw coaxial with the axle; and
    mean on one of the sidewalls engaging the screw to move the one sidewall relative to the other sidewall upon rotation of the screw overcoming the friction between the means and the screw.

16. A toy vehicle comprising:
    a chassis;
    a pair of substantially parallel, spaced apart axles, each with opposed ends, carried by the chassis for rotation relative to the chassis;
    motor means carried by the chassis and drivingly connected to each of the axles to rotate both of the axles in one direction;
    four wheels each having spaced apart sidewalls and a flexible shell of a predetermined thickness, an initial central diameter and an initial axial width between the sidewalls forming an initial, generally cylindrical, peripheral surface engagable with, and supporting the toy vehicle upon, a playing surface;
    one of the wheels mounted adjacent each end of each of the axles for rotation about an axis with the axle;
    means permitting movement of the sidewalls of each wheel with respect to each other along the axis of rotation so that movement of the sidewalls of each wheel toward each other decreases the initial width and increases the initial central diameter of the flexible shell forming an enlarged periphery that engages, and supports the toy vehicle upon, the playing surface; and a plurality of openings extending through the shell and across a portion of the initial width of the peripheral surface of the shell.

17. The toy vehicle of claim 16 in which each of the openings extend across a portion of the peripheral surface that is at least four times the thickness of the shell.

18. The toy vehicle of claim 16 including means for automatically moving one of the sidewalls relative to the other along the axis of rotation upon each wheel encountering an obstacle on the playing surface.

19. The toy vehicle of claim 16 in which the means permitting movement of the sidewalls with respect to each other comprises:

a screw adjacent each end of each of the axles coaxial with the respective axle; and mean on one of the sidewalls engaging the screw to move the one sidewall relative to the other sidewall upon rotation of the screw overcoming the friction between the means and the screw.

20. The toy vehicle of claim 16 including means for biasing the sidewalls relative to each other.

21. A toy vehicle comprising:
a chassis;
an axle carried by the chassis for rotation relative to the chassis;
a hollow wheel having spaced apart, rigid sidewalls and a flexible shell of a predetermined thickness, an initial central diameter and an initial axial width between the sidewalls forming an initial, generally cylindrical, peripheral surface engagable with, and supporting the toy vehicle upon, a playing surface;
the wheel mounted adjacent an end of the axle for rotation about an axis with the axle;
means permitting movement of the sidewalls with respect to each other along the axis of rotation so that movement of the sidewalls of the wheel toward each other decreases the initial width and increases the initial central diameter of the flexible shell forming an enlarged periphery that engages, and supports the toy vehicle upon, the playing surface; and
means for automatically moving one of the sidewalls toward the other upon the wheel encountering an obstacle on the playing surface.

22. The toy vehicle of claim 21 in which the means permitting movement of the sidewalls with respect to each other and the means for automatically moving one of the sidewalls comprise:

a screw coaxial with the axle; and means on one of the sidewalls engaging the screw to move the one sidewall relative to the other sidewall upon rotation of the screw overcoming the friction between the means and the screw.

23. A toy vehicle comprising:
a chassis;
a pair of substantially parallel, spaced apart axles, each with opposed ends, carried by the chassis for rotation relative to the chassis;

motor means carried by the chassis and drivingly connected to each of the axles to rotate both of the axles in one direction;

four wheels each having spaced apart, rigid sidewalls and a flexible shell of a predetermined thickness, an initial central diameter and an initial axial width between the sidewalls forming an initial, generally cylindrical, peripheral surface engagable with, and supporting the toy vehicle upon, a playing surface;

one of the wheels mounted adjacent each end of each of the axles for rotation about an axis with the axle;

means permitting movement of the sidewalls of each wheel with respect to each other along the axis of rotation so that movement of the sidewalls of each wheel toward each other decreases the initial width and increases the initial central diameter of the flexible shell forming an enlarged periphery that engages, and supports the toy vehicle upon, the playing surface; and means for automatically moving one of the sidewalls toward the other upon each wheel encountering an obstacle on the playing surface.

24. The toy vehicle of claim 23 in which the means permitting movement of the sidewalls of a wheel with respect to each other and the means for automatically moving one of the sidewalls comprises:

a screw adjacent each end of each of the axles coaxial with the respective axle; and means on one of the sidewalls engaging the screw to move the one sidewall relative to the other sidewall upon rotation of the screw overcoming the friction between the means and the screw.

25. A toy vehicle comprising:
a chassis;
an axle carried by the chassis for rotation relative to the chassis;
a pair of coaxially disposed and spaced apart cylindrical hubs located on each end of the axle;
a tire mounted on each end of the axle, each tire being formed of a tube of flexible material which is attached at one end around the periphery of one of the hubs of the pair of hubs and is attached at its other end around the periphery of the other hub of the pair of hubs; and
means for automatically moving at least one of the hubs of each pair of hubs along their common axis closer to the other when the tire mounted on them encounters an obstacle, whereby the central diameter of the tire is increased.

26. A toy vehicle of claim 25 wherein the means for automatically moving the hubs includes:
a screw coaxial with the hubs; and
means on one of the hubs engaging the screw to move the one hub relative to the other hub upon rotation of the screw overcoming the friction between the means and the screw.

27. A toy vehicle of claim 26 wherein the tube has a plurality of generally axially extending slits through it, whereby when the tube is compressed in the axial direction between the movable hubs to which it is attached, the slits open in the direction of the circumference of the tire.

28. A toy vehicle of claim 25 wherein the tube has a plurality of generally axially extending slits through it, whereby when the tube is compressed in the axial direction between the movable hubs to which it is attached, the slits open in the direction of the circumference of the tire.

* * * * *